Sept. 17, 1940.  E. A. WETZEL  2,214,947
GARNISH MOLDING RETAINER
Filed July 25, 1938
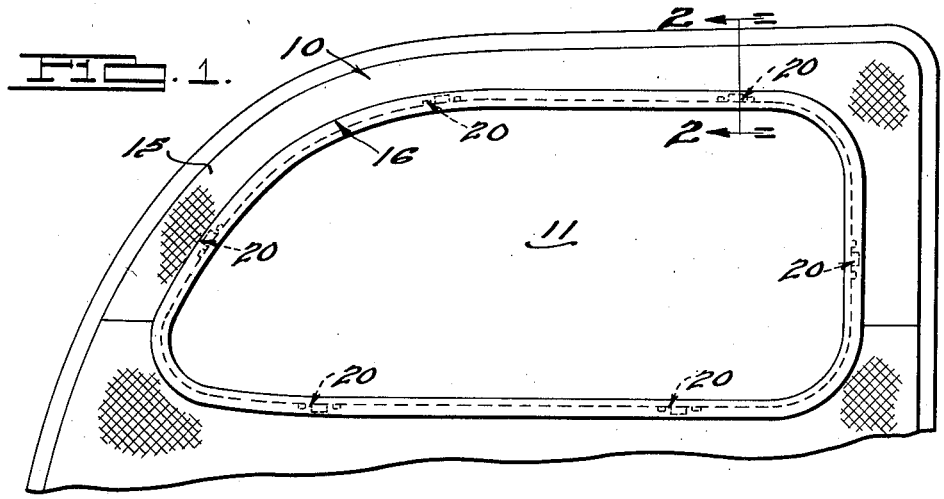
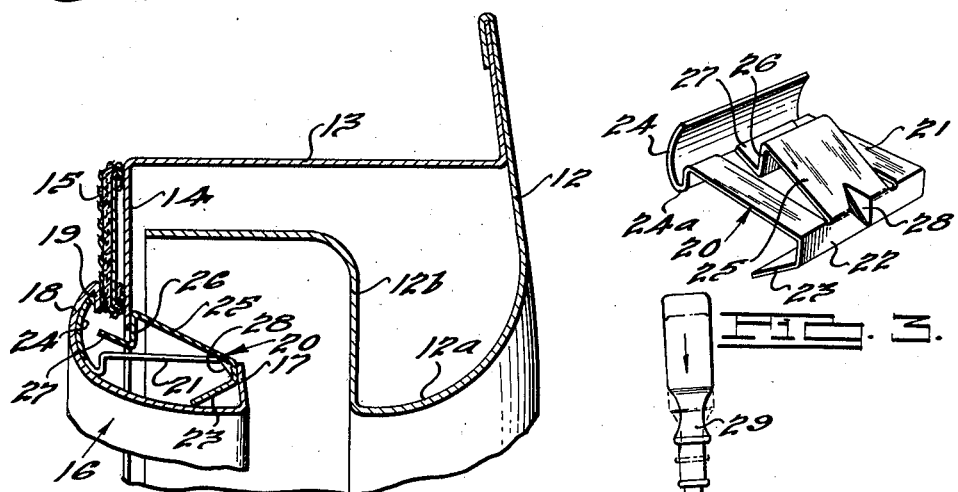
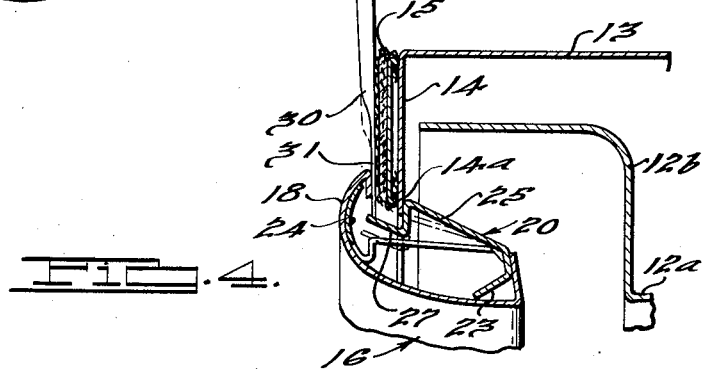
INVENTOR
Edward A. Wetzel.
BY Dike, Calver & Gray
ATTORNEYS Patented Sept. 17, 1940

2,214,947

UNITED STATES PATENT OFFICE 2,214,947

GARNISH MOLDING RETAINER

Edward A. Wetzel, Detroit, Mich., assignor to Briggs Manufacturing Company, Detroit, Mich., a corporation of Michigan Application July 25, 1938, Serial No. 221,079

7 Claims. (Cl. 296—44)

The present invention relates generally to garnish molding or the like and means for retaining such moldings or similar skeleton type frames within openings such as the window openings of automobile or other vehicle bodies. More particularly the invention relates to self-operating means for securing a molding formed preferably into a closed figure shaped and dimensioned to fit a given window opening in a vehicle or automobile body, which means automatically fixes the molding in place on the insertion thereof in the said opening.

Heretofore, various methods have been used or proposed for securing garnish or interior finish moldings within the margins of window openings of automobile bodies. Screws passing through the molding and engaging nuts or screw bosses on the window frame have largely been utilized. This method has been objectionable owing to the time, expense and difficulties involved in applying the screws and the unsightly appearance of the molding especially in cases where the exposed heads of the screws tarnish or become rusty. Suggestions have also been made for providing concealed fasteners to permit the molding to be sprung or snapped into place, none of which having proved successful, particularly on account of their impractical nature and difficulties presented in attempting to remove the moldings for repair or servicing.

An object of the invention is to overcome disadvantages of previous molding retaining means and to provide an improved concealed means for retaining the molding firmly in place and so constructed as to permit assembly of the molding by merely inserting it within the window opening and exerting pressure to snap it into place.

A further object of the invention is to provide an improved garnish molding retainer means of the concealed spring or yieldable type permitting easy and quick installation of the molding and also removal thereof for repair or replacement or other servicing requirements.

Another object is to provide a concealed retainer means for garnish moldings or similar skeleton frames of the closed figure type permitting easy installation and also removal through the medium of a tool or implement which is insertable from the inner side of the window frame.

Other objects of this invention will appear in the following description and appended claims, reference being had to the accompanying drawing forming a part of this specification wherein like reference characters designate corresponding parts in the several views.

Fig. 1 is a fragmentary side elevation of an automobile door embodying the present invention.

Fig. 2 is an enlarged vertical section taken substantially through lines 2—2 of Fig. 1, looking in the direction of the arrows.

Fig. 3 is a perspective view of a retainer clip.

Fig. 4 is a view similar to Fig. 2 illustrating the manner in which the molding is removed from its supporting frame.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is illustrated, by way of example, one embodiment of the invention as applied to a garnish molding and adapted to fit around the marginal edges of the window opening of an automobile body. Although the invention is shown as applied to the door of an automobile body it will be understood that the invention is applicable to all windows of automobile or other vehicle bodies.

There is shown at 10 a vehicle door having a window frame defining the window opening 11. The window framing is formed through the medium of an outer body panel 12 and inner pressed metal framing members, the header of the window frame being shown, by way of example, at 13 in Fig. 2. The outer panel 12 is pressed to provide a window reveal 12a terminating in angular flanging 12b forming the marginal housing for the window glass or closure of the window opening. As shown in Fig. 2 the header 13 of the window frame terminates at the inner side of the door in a downturned substantially vertically extending marginal flange 14. The flanging 14 preferably extends continuously around the inner edge of the window frame and in the present instance provides the supporting means for the garnish or finish molding. The inner face of the door frame is finished by means of fabric covered trim paneling 15 which conceals the marginal flanging 14 around the opening. In the present instance the trim paneling on the inner face of the door frame comprises a foundation strip or sheet of relatively stiff flexible material, such as thin sheet metal or fibreboard, the former being shown in Fig. 2. This foundation sheet or strip may be covered with a layer of padding or wadding and this latter layer covered by suitable trim fabric.

The garnish molding of the present embodiment is designated by the reference character 16. This molding is shown as a continuous generally channel-shaped metal member forming a closed figure shaped to fit the margin of the window opening. The molding may vary materially in cross-section and is preferably in the form of a metal strip rolled to produce a channel. In the present instance the molding 16 has an intermediate curved web portion terminating in a continuous inner flange 18 and an outer turned flange 17. The metal along the free edge of the flange 18 is turned in towards the channel of the molding to provide a smooth face adapted to bear against the edge of the trim panel material 15.

The molding is of a snap-on type and is releasably held in position on the window frame by means of a series of spring retainer clips or fasteners generally designated by the reference character 20. Any suitable number of retainer clips 20 may be provided and these are mounted at predetermined intervals along the length of the molding within the channel thereof between the opposed flanges 17 and 18. The spring clip or fastener 20 is pressed or stamped from a sheet metal blank, and in the embodiment herein illustrated comprises a central generally flat body 21 flanged down at one end 22 and thence turned or bent in angularly at 23. At the opposite end of the body the clip is provided with a curved flange 24 bent up in a direction opposite to the flanging 22 and 23. The flange 24 is joined to the body by a depending bowed or bent portion 24a permitting the curved flange 24 to flex or yield slightly relatively to the body 20. The flange 24 is formed to the shape of the inner surface of the curved flange 18 of the garnish molding and the inclination of the flange 22 is determined so as to extend parallel to the flange 17 of the molding. Struck from the metal of the body 20 is a spring locking portion or member 25, the face of which is inclined with respect to the body 21. The tapered spring member 25 extends from the flange 22 inwardly and upwardly in the direction of the molding flange 18 and terminates in a stepped portion comprising a downturned inclined locking flange 26 terminating in an inwardly bent upwardly inclined releasing flange 27. The juncture of the locking piece 25 and the flange 22 is reinforced by means of a pressed-in rib 28.

The retainer clip 20 is sufficiently flexible or yieldable in an endwise direction to permit it to be forced into position between the molding flanges 17 and 18, the clip being preferably placed sufficiently in compression to grip the molding flanges and remain firmly held in position therebetween.

The garnish molding may be installed by fitting it against the margin of the window opening in such position that the lower edge 14a of the flanging 14 will bear against the tapered faces 25 of the retainer clips. By forcing or pressing the garnish molding outwardly from the inside of the body the spring members 25 will be depressed or sprung down, permitting the face 25 of each clip to ride over the lower edge of the window frame flanging 14 until the shoulder 26 clears it, whereupon the locking members 25 will snap into the position shown in Fig. 2 with the shoulder or flange 26 overlapping and abutting the outer face of the frame portion 14. The garnish molding will thus be firmly held in position and the inner flanging 18, 19 will bear against and conceal the marginal edge of the trim panel material 15.

An important feature of the present invention resides in the simplification of construction and the efficient and practical manner in which the molding is securely held in position. It is important to note, however, that the molding may be easily and quickly removed from the inside of the body or door and without any danger of damaging or marring the parts. This may be accomplished as shown in Fig. 4 by means of a suitable tool or implement 29 having a handle provided with a shank 30 which terminates in a relatively thin blade or working end 31. Since the trim panel material 15 is somewhat compressible the thin end 31 of the implement may be readily inserted between the trim panel and the garnish molding flange 19 so as to engage the flange 27 of the clip which is arranged to extend immediately below this point. As shown in Fig. 4 the flange 27 may be forced down to the dotted position by means of the tool 29, causing the locking shoulder 26 of the clip to clear the edge of the frame portion 14 at which time the molding will spring in at this point sufficiently to prevent the locking member 25 from snapping back into locking position when the tool is withdrawn. Thus, the several clips around the garnish molding will be released successively in this manner, permitting removal of the molding.

I claim:

1. A garnish molding or the like comprising an open generally channel shaped member having inner and outer side flanges, and a retainer clip mounted in the channel between said flanges and having a resilient bendable locking portion intermediate said flanges extending in the direction of the inner molding flange and terminating in a generally vertically positioned shoulder having an extension spaced from the margin of said inner molding flange, said extension being engageable by a tool for bending said locking portion into a releasing position.

2. A snap-on garnish molding adapted to be mounted along the margin of the framing around a window opening, comprising a spring locking device on the molding engageable with a marginal portion of the framing for locking the molding in place, said device being concealed by the molding when the molding is mounted on the framing and having a part engageable by an implement insertable between the molding and framing at the inner side of the latter to release said device.

3. The combination of a window frame defining a window opening, a snap-on molding fitting the margin of the opening, a spring clip anchored in said molding and having a yieldable portion engageable directly with a part of the frame for locking the molding when forced into place, said clip having a portion extending inwardly and so spaced from the said part of the frame that it is positioned to be engaged by an implement insertable between the molding and inner side of frame to release the clip from the frame.

4. The combination of a window frame defining a window opening and having a marginal substantially vertical flange along the inner edge of the opening, a snap-on molding fitting the margin of said opening and having a generally channel-shaped cross section, a metal clip confined within said molding and having a releasable spring locking portion normally engageable behind said flange when said molding is forced into position on the frame, said locking portion being bendable out of engagement with the flange and adapted to remain in the latter position until returned to its locking position.

5. The combination of a window frame defining a window opening and having a marginal substantially vertical flange along the inner edge of the opening, a snap-on molding fitting the margin of said opening and having a generally channel-shaped cross section, a metal clip removably confined under tension within said molding and having a spring locking portion engageable behind said flange when said molding is forced into position on the frame, said locking portion having a projection extending past the free edge of the flange and terminating in front of the flange in a position to be engaged by an implement inserted between the molding and the inner side of the flange.

6. The combination of a window frame defining a window opening and having a marginal substantially vertical flange along the inner edge of the opening, a snap-on molding fitting the marginal edge of said opening and having a generally channel-shaped cross section, a metal clip removably confined under tension within said molding and having a generally vertical shoulder engageable behind said flange, which shoulder terminates in a bent projection spaced from the free edge of the flange and extending in front of the flange in a position to be pressed by an implement inserted between the molding and inner side of the flange to release the locking portion by removing the shoulder thereof from engagement with the flange.

7. The combination of a window frame defining a window opening and having a marginal substantially vertical flange along the inner edge of the opening, a snap-on molding fitting the margin of said opening and having a generally channel-shaped cross section, a metal clip removably confined under tension within said molding and having a releasable spring locking portion normally positioned to engage said flange on its outer side, said portion having a bent projection spaced from the free edge of the flange and extending in front of the flange in a position to be pressed by an implement inserted between the molding and inner side of the flange to release the locking portion by removing the shoulder thereof from engagement with the flange and being constructed to remain in a released position until returned to a locking position.

EDWARD A. WETZEL.